US011216515B2

(12) United States Patent
Khan et al.

(10) Patent No.: US 11,216,515 B2
(45) Date of Patent: Jan. 4, 2022

(54) SEARCH SYSTEM FOR PROVIDING QUERY RESULT ITEMS BASED ON HIGHEST SKIP PROBABILITIES OF ITEM TITLE TOKENS

(71) Applicant: eBay Inc., San Jose, CA (US)

(72) Inventors: Ishita Kamal Khan, San Jose, CA (US); Prathyusha Senthil Kumar, Morgan Hill, CA (US); Daniel Miranda, San Jose, CA (US); David Goldberg, Palo Alto, CA (US)

(73) Assignee: eBay Inc., San Jose, CA (US)

( * ) Notice: Subject to any disclaimer, the term of this patent is extended or adjusted under 35 U.S.C. 154(b) by 258 days.

(21) Appl. No.: 15/836,744

(22) Filed: Dec. 8, 2017

(65) Prior Publication Data

US 2019/0179962 A1  Jun. 13, 2019

(51) Int. Cl.
*G06F 16/9535* (2019.01)
*G06N 7/00* (2006.01)
(Continued)

(52) U.S. Cl.
CPC .... *G06F 16/9535* (2019.01); *G06F 16/24578* (2019.01); *G06F 16/3334* (2019.01);
(Continued)

(58) Field of Classification Search
CPC ............. G06F 16/9535; G06F 16/9038; G06F 16/24578; G06F 16/9536; G06F 16/3334; G06N 7/005; G06N 20/00; G06Q 30/0631
See application file for complete search history.

(56) References Cited

U.S. PATENT DOCUMENTS

| 7,636,714 | B1 | 12/2009 | Lamping et al. |
| 8,060,456 | B2 * | 11/2011 | Gao ................. G06F 16/24578 706/12 |

(Continued)

FOREIGN PATENT DOCUMENTS

WO    2019/113515 A1    6/2019

OTHER PUBLICATIONS

Khan et al., "What is Skipped: Finding Desirable Items in E-Commerce Search by Discovering the Worst Title Tokens", 2017, 10 pages.

(Continued)

*Primary Examiner* — Ashish Thomas
*Assistant Examiner* — Yohanes D Kelemework
(74) *Attorney, Agent, or Firm* — Shook, Hardy & Bacon L.L.P.

(57) ABSTRACT

Various methods and systems for providing query result items using an item title demand model are provided. A query is received at a search engine. Based on receiving the query, an item title demand engine is accessed. The item title demand engine operates based on an item title demand model which uses token weights, representing skip probabilities of tokens in item titles, to determine title scores for result item titles for corresponding queries. Based on accessing the item title demand engine, one or more result item titles for the query are identified from items in an item database. An identified result item title is identified based on a title score determined using the item title demand model and a highest skip probability of a token in the result item title. The one or more result item titles are communicated to cause display of the one or more result item titles.

20 Claims, 9 Drawing Sheets

(51) Int. Cl.
*G06F 16/9038* (2019.01)
*G06F 16/2457* (2019.01)
*G06N 20/00* (2019.01)
*G06F 16/9536* (2019.01)
*G06F 16/33* (2019.01)
*G06Q 30/06* (2012.01)

(52) U.S. Cl.
CPC ...... *G06F 16/9038* (2019.01); *G06F 16/9536* (2019.01); *G06N 7/005* (2013.01); *G06N 20/00* (2019.01); *G06Q 30/0631* (2013.01)

(56) References Cited

U.S. PATENT DOCUMENTS

| | | |
|---|---|---|
| 8,489,533 B2 | 7/2013 | Wang et al. |
| 8,903,810 B2 | 12/2014 | Ismalon |
| 8,909,627 B1 | 12/2014 | Popovici et al. |
| 9,092,517 B2 | 7/2015 | Paparizos et al. |
| 9,141,672 B1 * | 9/2015 | Popovici .............. G06F 16/9032 |
| 9,336,772 B1 * | 5/2016 | Salvador ............... G10L 15/183 |
| 2007/0266025 A1 * | 11/2007 | Wagner ................ G06F 16/9535 |
| 2016/0140125 A1 | 5/2016 | Goyal et al. |
| 2017/0193072 A1 * | 7/2017 | Vase ................... G06Q 30/0623 |
| 2018/0189292 A1 * | 7/2018 | Grace, Jr. .............. G06F 16/93 |

OTHER PUBLICATIONS

Ekstrand et al., "Collaborative Filtering Recommender Systems", Foundations And Trends, In Human-computer Interaction, vol. 4, No. 2, Jan. 1, 2010, pp. 81-173.
International Search Report received for PCT Patent Application No. PCT/US2018/064575, dated Feb. 14, 2019, 5 pages.
Written Opinion received for PCT Patent Application No. PCT/US2018/064575, dated Feb. 14, 2019, 10 pages.
International Preliminary Report on Patentability received for PCT Application No. PCT/US2018/064575, dated Jun. 18, 2020, 9 Pages.

* cited by examiner

Query: iphone 7

Query Model

| Token | Weight |
|---|---|
| iphone | 0.995 |
| 7 | 0.987 |
| apple | 0.914 |
| black | 0.543 |
| broken | 0.223 |
| case | 0.104 |

Title Scores

| Title | Average-All | Min |
|---|---|---|
| apple iphone 7 | 0.965 | 0.914 |
| iphone 7 black | 0.842 | 0.543 |
| broken iphone 7 | 0.735 | 0.223 |
| black iphone 7 case | 0.657 | 0.104 |

FIG. 4

Query: polaroid camera

| Token | OCS-ISLE | Baseline |
|---|---|---|
| polaroid | 0.998 | 5294 |
| camera | 0.854 | 5287 |
| instant | 0.807 | 4947 |
| fujifilm | 0.435 | 4105 |
| strap | 0.218 | 1931 |
| lens | N/A | 719 |

530

OCS-ISLE 510

- Average-all: 0.266  Min: 0.807
  Polaroid Snap Touch Instant Print Digital Camera With LCD Display

- Average-all: 0.258  Min: 0.435
  Blue Close Up Lens Filter Polaroid For Fujifilm Instant Digital Camera YG

- Average-all: 0.240  Min: 0.218
  Shoulder Neck Belt Strap for all DSLR, Mirrorless, Polaroid Instant Camera New

Baseline 520

- Sum: 20352
  Blue Close Up Lens Filter Polaroid For Fujifilm Instant Digital Camera YG

- Sum: 17459
  Shoulder Neck Belt Strap for all DSLR, Mirrorless, Polaroid Instant Camera New

- Sum: 15528
  Polaroid Snap Touch Instant Print Digital Camera With LCD Display

| Token | OCS-ISLE | Baseline |
|---|---|---|
| rechargeable | 0.947 | 5175 |
| battery | 0.862 | 5062 |
| lithium | 0.1450 | 1181 |
| charger | 0.499 | 4428 |
| clear | 0.112 | 1560 |
| case | 0.024 | 719 |

Query: rechargeable batteries

SEARCH SYSTEM FOR PROVIDING QUERY RESULT ITEMS BASED ON HIGHEST SKIP PROBABILITIES OF ITEM TITLE TOKENS

BACKGROUND

Search systems support identifying, for received queries, query result items from item databases. Given a query for an item in an item database, the relevance, of titles of the items, in the item database, to user intent for performing the query, is an important signal in ranking the items identified from the item database as query result items. For example, computing the signal indicating the relevance can be based on a machine-learning model that uses words as features and selected items from previous user clicks, to generate a prediction score on what another user might click, such that the prediction score is used to rank query result items.

SUMMARY

Embodiments of the present invention relate to methods, systems and computer storage media for providing query result items using an item title demand model. In particular, generating and ranking query result items is based on a search system having an item title demand model which is a machine learning model that uses historical user search behavior data for a query, to generate a parameter-based model for each query. The parameter-based model, of historical user behavior data, learns why users skip a result item title. The historical user search behavioral data is used to find the parameters of the skipped item title to generate an Item Skip Likelihood Estimation (ISLE) model. Since the reasons item titles are skipped vary widely across queries, the parameter-based model supports defining a separate skip likelihood model for each query. As part of the item title demand model, the parameter-based model supports determining what a demand of an item title is, for a corresponding query, by focusing on tokens within a title, and specifically a token having the highest skip probability (i.e., the "worst" token in the title). In this regard, the item title demand model operates based on the premise that a skip probability of an item, represented by the item title, is dependent at least in part on the highest skip probability of a token in the title (i.e., skip probability of its worst token). In one embodiment, the model can be extended to generate an item attribute score, for item attributes of an item corresponding to an item title, where the attributes are defined and classified as structured content. In another embodiment, the item title demand model and the title score can used in a ranking engine and more specifically as a feature in the ranking engine of the search system.

In operation, at a high level, a query is received at a search engine. Based on receiving the query, an item title demand engine is accessed, the item title demand engine operates based on an item title demand model that uses token weights, based on skip probabilities of tokens in item titles, to determine title scores for result item titles for corresponding queries. Based on accessing the item title demand engine, identifying, from items in an item database, one or more result item titles for the query. An identified result item title of the one or more result item titles is identified based on a title score determined using the item title demand model and a highest skip probability of a token in the result item title. The one or more result item titles are communicated to cause display of the one or more result item titles.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Search systems support identifying, for received queries, result items from item databases. Item databases can specifically be for content platform or item listing platforms such as EBAY content platform, developed by EBAY INC., of San Jose, Calif. Effectively ranking result items for queries can be a challenge for search engines associated with content platforms. Given a query for an item in the item database, the relevance of titles, of the items in the item database to user intent for performing the query, is an important signal in ranking the items identified from the item database as query result items. In particular, the result items can be ranked, based on their relevance, to obtain the most responsive item ordering.

In conventional search systems, generating and ranking query result items can be based on a machine learned model that learns from an extensive set of features derived from item listings. For example, a Naïve Bayes model is a common approach, based on click counts, for identifying query result items in search systems. In particular, computing the signal indicating the relevance can be based on a machine-learning model that uses words as features and selected items from previous user clicks, to generate a prediction score on what another user might click, such that the prediction score is used to rank query result items. Conventional systems running on such existing models, which depend primarily on click-based approaches for rating search results items, can often show limitations in performance when generating and ranking query result items from an item database. These limitations can be particularly apparent in item databases where the lifetime of item listings is much shorter than typical web search listings. As such, a comprehensive search system with an alternative basis for identifying query result items can improve user search experiences.

Embodiments of the present invention are directed to simple and efficient methods, systems and computer storage media for providing query result items using an item title demand model. In particular, generating and ranking query result items ("result items") is based on a search system having an item title demand model which is a machine learning model that uses historical user search behavior data (e.g., search session data including click data), for a query, to generate a parameter-based model for each query. The parameter-based model, of historical user behavior data, learns why users skip a result item title. The historical user search behavioral data is used to find the parameters of the skipped item title to define the Item Skip Likelihood Estimation (ISLE) model. Since the reasons item titles are skipped vary widely across queries, the parameter-based model supports defining a separate skip likelihood model for each query. As part of the item title demand model, the parameter-based model supports determining what a demand of an item title is, for a corresponding query, by focusing on tokens within a title, and specifically a token having the highest skip probability (i.e., the "worst" token in the title). In this regard, the item title demand model operates based on the premise that a skip probability of an item, represented by the item title, is dependent at least in part on the highest skip probability of a token in the title (i.e., skip probability of its worst token).

As an example, if a user is looking for a kitchenaid mixer, the search query is executed to identify query result item titles containing the terms kitchenaid and mixer, query result items titled kitchenaid artisan series stand mixer and kitchenaid 6 qt professional mixer would have a greater demand than those for kitchenaid mixer dough hook or whisk attachment for kitchenaid 6 qt mixer. However for the query kitchenaid mixer attachment, the latter results would be more desirable. Accordingly, the query-specific ISLE model is constructed such that, given a query and an item title, the ISLE computes a score reflecting how well the item title matches user demand for that query, so that as shown in the example above, the differences in the demand of items for query kitchenaid mixer and kitchenaid mixer attachment are recognized. With reference to another example, to support the premise that a skip probability of an item title, is equal to the highest skip probability of a token in the title (i.e., skip probability of its "worst" token), consider the query iphone 7, and titles apple iphone 7 16 gb white and iphone 7 verizon 16 gb screen cracked. Although both results are iphone 7 phones, the token cracked in the second title makes it less in demand for the query. In other words, cracked uniquely stands out as the deciding factor for a relatively higher skip likelihood of the item.

Embodiments of the present invention can be described with reference to several inventive features (e.g., operations, systems, engines, and components) associated with a search system having the item title demand model. Inventive features described below include: operations for modeling skips for individual queries that further include extending the item title demand model to generate an item attribute score, offline computation of token weights, online computation of title scores, and ranking result items. Functionality of the embodiments of the present invention can further be described, as done below, by way of an experimental implementation and anecdotal examples, to demonstrate that the operations for providing query result items using an item title demand model are an unconventional ordered combination of operations that provide an item title demand model as a solution to a specific problem in search technology environment to improve computing operations in generating and ranking result items and improve search systems overall.

Figure 1:
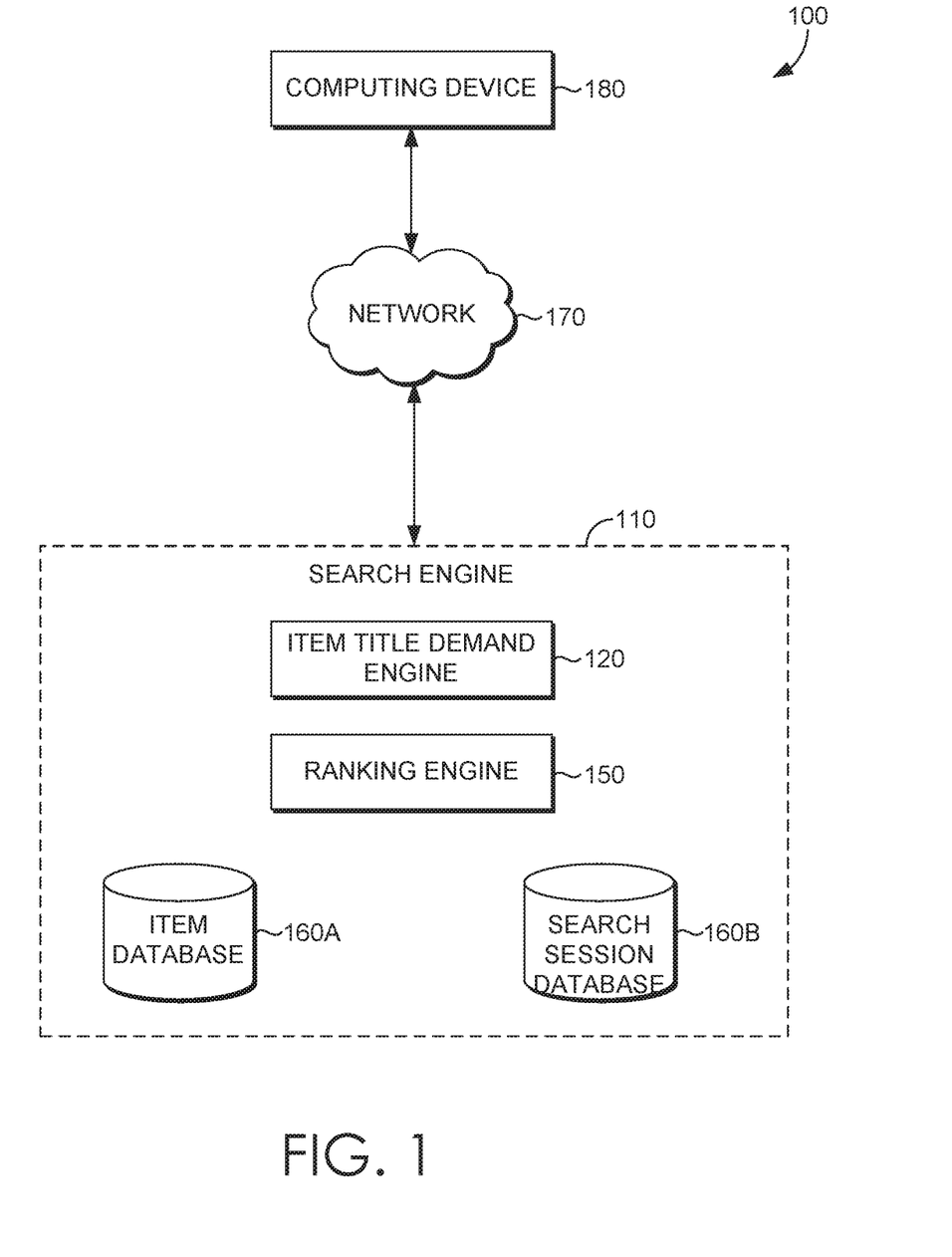
FIG. 1 is a block diagram of an exemplary search system with an item title demand engine, in which embodiments described herein may be employed.

With reference to FIG. 1, FIG. 1 illustrates an exemplary search system 100 in which implementations of the present disclosure may be employed. In particular, FIG. 1 shows a high level architecture of search system 100 having components in accordance with implementations of the present disclosure. Among other components or engines not shown, search system 100 includes a computing device 180 communicating via a network 170 with a search engine 110. The search engine 110 includes item title demand engine 120, ranking engine 150, item database 160A and search session database 160B. The components of the search system 100 may communicate with each other over one or more networks (e.g., public network or virtual private network "VPN") as shown with network 170. The network 170 may include, without limitation, one or more local area networks (LANs) and/or wide area networks (WANs). The computing device 180 can be a client computing device that corresponds to the computing device described herein with reference to FIG. 9.

The components of the search system 100 can operate together to provide functionality for generating query result items based on an item title demand model, as described herein. The search system 100 supports processing queries from the computing device 180. In particular, the computing device 180 can receive a query (e.g., a query from a user for an item listing in an item listing database) and communicate the query to the search engine 110. The computing device 180 can also receive result items (e.g., result items data) for the query from the search engine 110 and display or cause display of the result items.

The search engine 110 is responsible for identifying result items for queries received at the search engine. Result items can generally refer to a representation, identifier, or additional related data and metadata associated with an item listing in an item database, where the result item is identified as being responsive to a corresponding query. The search engine 110 can receive a query such that result items for the query are provided, generated, identified, ranked or communicated based on and using the components in the search engine 110. The search engine components include item title demand engine 120, ranking engine 150, item database 160A and search session database 160B.

At a high level, based on a query received via the computing device 180, search engine 110 operations are performed using the item title demand engine 120 having an item title demand model for generating title demand scores ("title scores") of item titles for items in the item database 160A. Generating the title scores is based at least in part on historical user search behavior data (e.g., search session data) retrieved from search session database 160B. The title score can also be generated based on item attribute score, for item attributes of an item corresponding to an item title, where the attributes are defined and classified as structured content of a particular item. The ranking engine 150 can use the title scores in ranking result items. The ranked results items are then communicated from the search engine 110 to the computing device.

Embodiments of the present invention can further be described with reference to FIGS. 2 and 3, where FIGS. 2 and 3 further illustrate components in, and outputs from, the search engine 110 and specifically the item title demand engine 120. The item title demand engine 120 further includes token weight computation component 130 and the title score computation component 140. The token weight computation component 130 manages and processes a first set of operations, data structures and data (i.e., data sampling 132, query level title and token data 134, ISLE modeling 136, and item score distribution 138) and item demand score computation component 140 manages and processes a second set of operations, data structures and data (i.e., ISLE table lookup 142, title score aggregation 144, and title score normalization 146).

Initially, with reference to modeling skips, for each query, the item title demand engine 120 builds a separate model, to help keep the item title model agnostic of complexities associated with a query independent model. The item title demand engine 120 can use search session data (e.g., search session data 160B) in building a query model. Given a query, an algorithm is selected to estimate Pr(w), the probability of skipping a word w if the word appears in a title on the search result page for the query. For example, if the query is iphone, then the expectation can be that Pr(!broken!) will be high and Pr(!apple!) will be low. The item title demand engine 120 operates based on an Item Skip Likelihood Estimation (ISLE) model which is based on the premise that if a title consists of words $w_1, w_2, \ldots, w_m$ then the probability of skipping the title is:

$$\max_{i=1}^{M} Pr(w_i)$$

In other words the probability of skipping a title can be considered as the highest skip probability of a token in the item title (i.e., skip probability of its "worst" token). The item title demand engine 120 estimates Pr(w) using maximum likelihood.

Accordingly, the item title demand engine 120 can be operated to build an ISLE model using a data-set of queries and clicked and skipped item titles on search results pages ("SRPs") for those queries extracted from search behavioral logs in the search session database 160B. For a given query, say $(T_i, \delta_i)$ is the data for the $i^{th}$ title, $\delta_i$ is 1 if the title was clicked and 0 if it was skipped. The $j^{th}$ word of $T_i$ is $w_{ij}$. Using this notation and considering N titles for a query, the skip likelihood is:

$$\prod_{i=1}^{N} (\max_j Pr(w_{ij}))^{1-\delta_i} (1 - \max_j Pr(w_{ij}))^{\delta_i}$$

The item title demand engine 120 can further enhance the ISLE model in two ways: firstly, by augmenting the click signal with a number of other sale related signals in a content platform or item listing platform, which include sales, addition to shopping cart etc. These additional signals while sparse are cleaner and correlate better with demand. Secondly, in addition to title tokens the item title demand engine can also leverage structured data text on the items, like the product category the item is associated with.

Figure 4:
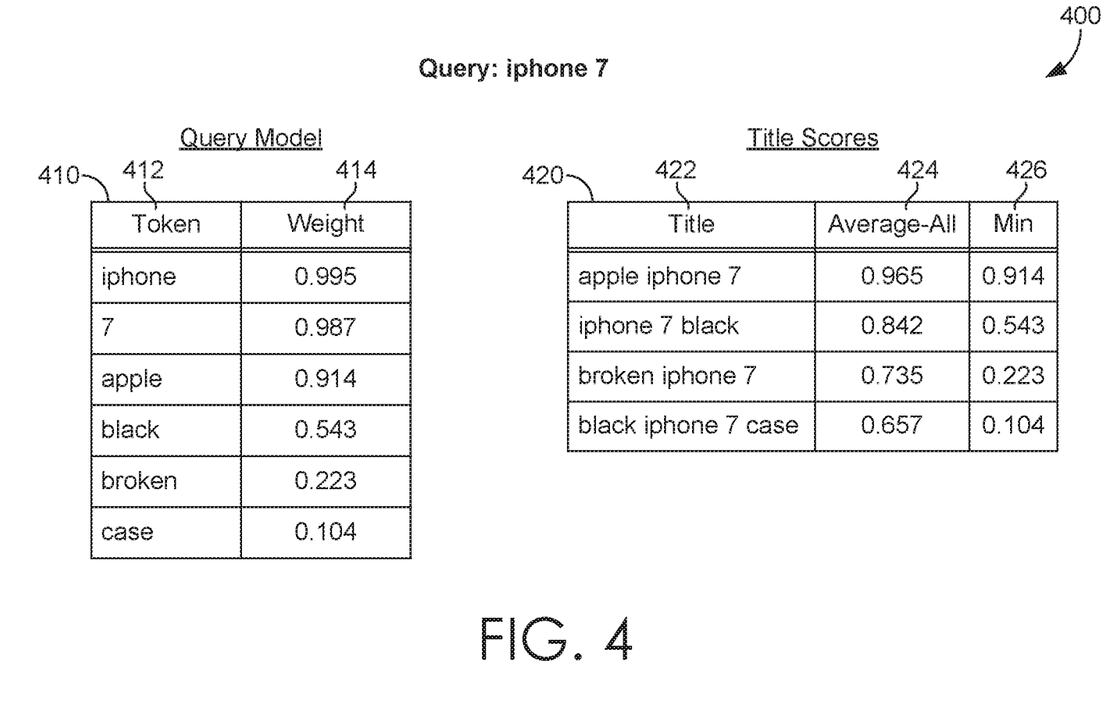
FIG. 4 is an exemplary illustration of query models and title demand scores, in which embodiments described herein may be employed.

Turning to FIG. 4, a simplified example demonstrating the ISLE model for query iphone 7 is shown having query model table 410, tokens 412 and token weights 414 and title scores table 420 with corresponding titles 422, average-all 424, and min 426, as described more fully below. The token skip probabilities learned by the model and converted into click probabilities (referred to as token weights) are shown in the Pr(Skip) query model table 410. As expected, tokens broken and case have lower weights compared to the relevant tokens such as apple. Based on these weights, the ISLE model scores the item titles with an aggregation function, two such are shown in the title scores table 420: average-all 424 and min 426 and the relative ordering of the sample item titles based on these title scores. By looking at their titles alone, this ordering matches perceived demand for the items with the two less desirable or demanded items for the query (with tokens broken and case) ranked lower.

Figure 2:
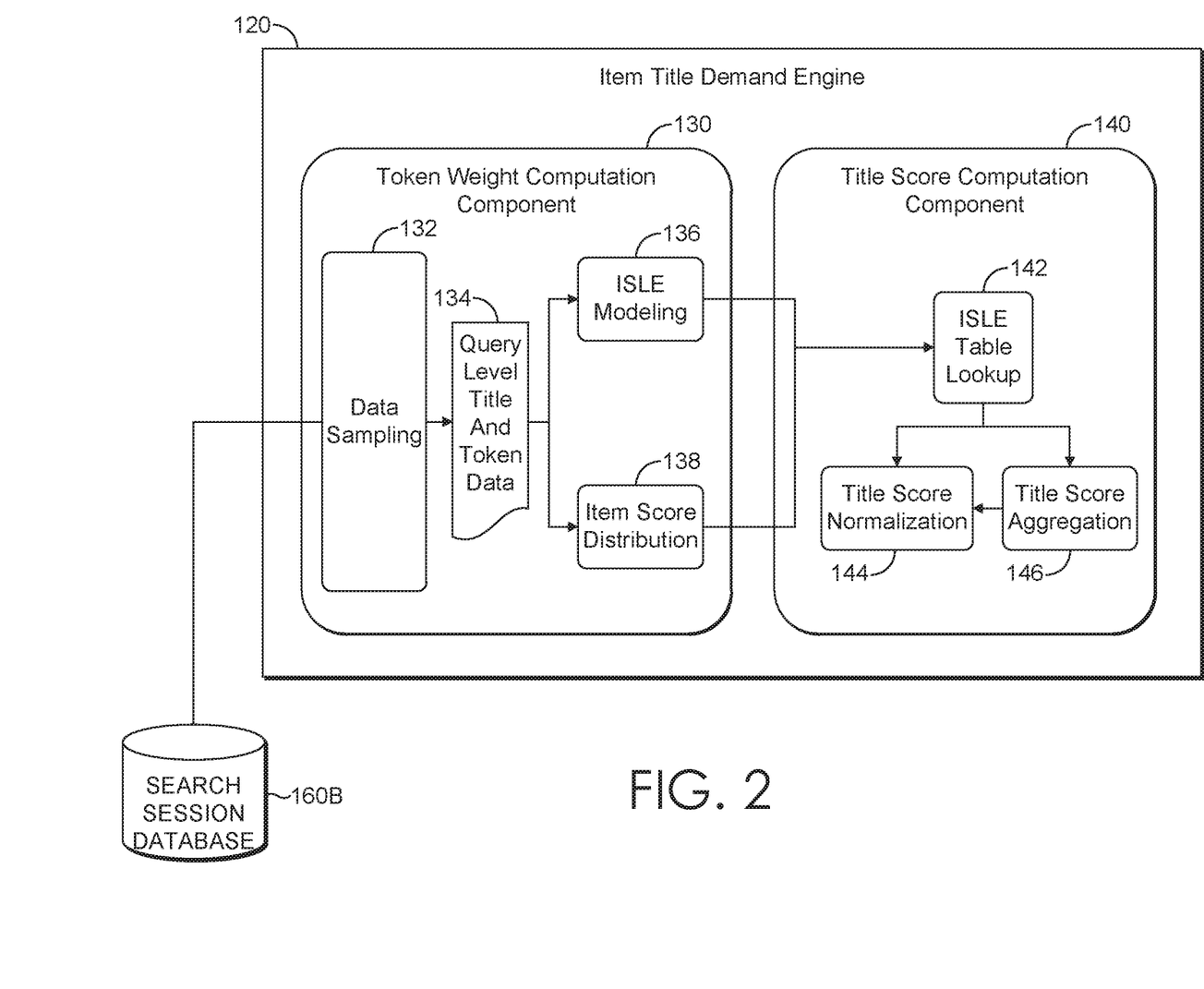
FIG. 2 is a block diagram of an exemplary search system with an item title demand engine, in which embodiments described herein may be employed.
Figure 3:
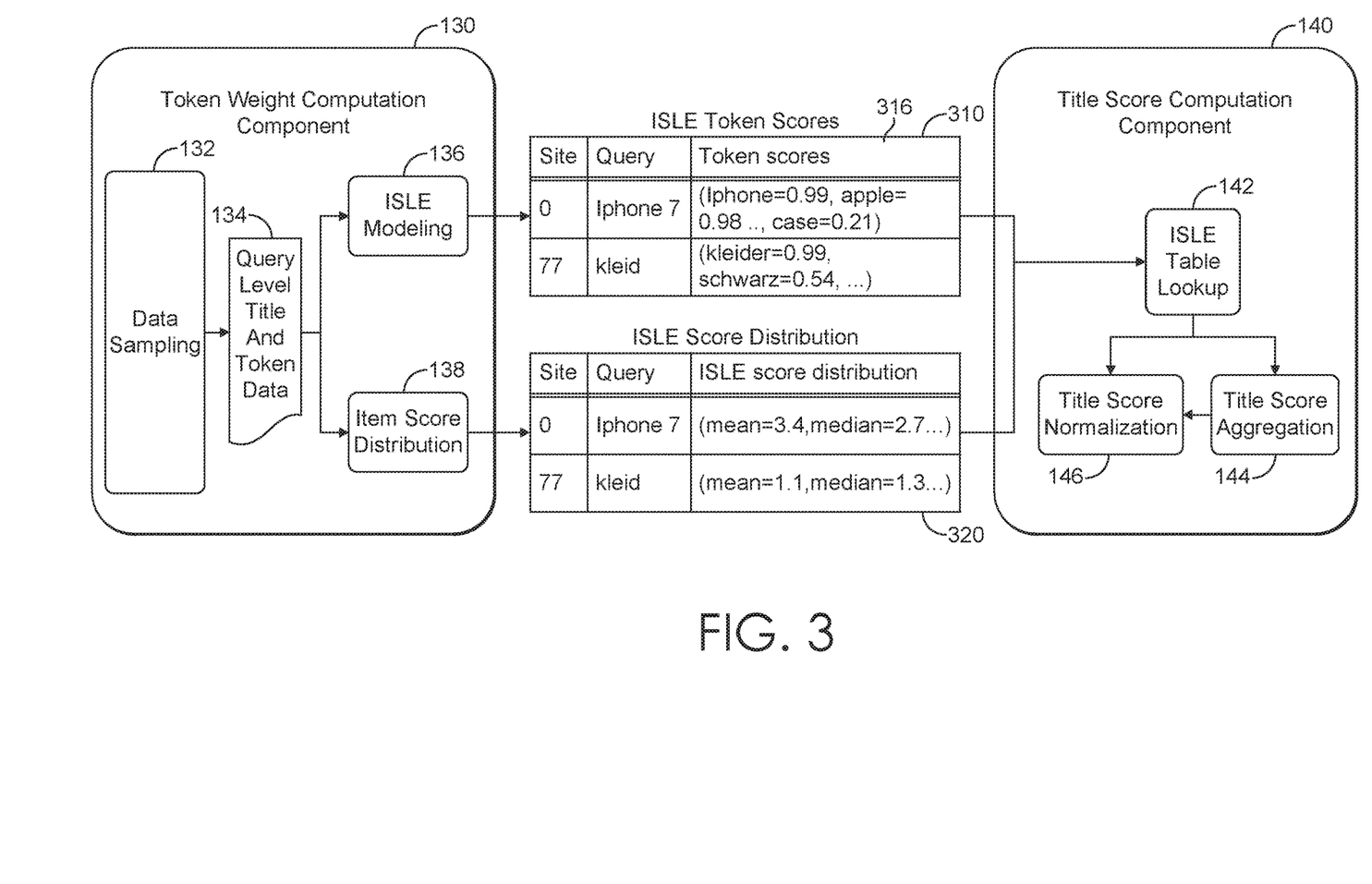
FIG. 3 is a block diagram of an exemplary search system with an item title demand engine, in which embodiments described herein may be employed.

With reference to FIGS. 2 and 3, FIGS. 2 and 3 illustrate operations, data and data structures for offline computation of token weights and online computation of title scores, which refer to the two phases of the item title demand model ISLE model ("model") generation and application operations. In the first phase of offline computation of token weights, given a user query, the model looks at user interactions with items shown in the most recent past and learns token skip probabilities for a finite number of relevant tokens for the query. Skip probability for the $i^{th}$ token signifies the probability that a user will skip an item given that the $i^{th}$ token is part of the item's title. This computation is done using maximum likelihood where the token skip probabilities are the parameters of the likelihood function that are learned in the optimization process. These token skip probabilities are converted to click probabilities (1−Pr(skip)). The click probabilities are stored in a fast lookup table as token weights to be used in the next phase, saving significant online computational time. In the second phase of online computation of title scores operates based on a received query, such that the model looks up the relevant token weights from the lookup table for that query and uses an aggregation function to compute a score for each item in a plurality of items (e.g., a recall set). This title score is further normalized using data distribution from a second lookup table and the normalized score is used as a feature for the overall ranking algorithm.

With reference to FIG. 1, the ranking engine 150 can operate to rank a plurality result items, based on their relevance, to obtain the most responsive item ordering. For example, the ranking engine can operate based on a ranking algorithm that retrieves the most relevant items from a corpus of item listings. In operation, a first round ranking function handles the entire recall set of a query and filters again by an extensive second ranking function. It is contemplated with embodiments of the present invention that the ranking engine uses the ISLE model for both the first round ranker to generate a good quality reduced recall set as well as the second round ranker for finer distinction in item desirability.

The overall architecture of the ISLE model can be further described with reference to FIG. 3, illustrating the token weight computation component 130 showing the offline query specific token weight computation which is stored in the ISLE token score table 310 and ISLE score distribution table 320 lookup tables and the title score computation component 140 depicting online title score computation using data in the lookup tables. The offline model generation itself happens in three phases. The first phase is sampling (i.e., data sampling 132 to generate query level title and token data 134) from user behavioral signals (i.e., historical user search behavior data) for queries issued over a selected time frame (e.g., a 6-week time frame). Next, in the modeling phase (i.e., ISLE modeling 136), token weights are learned by looking at the probabilities of users skipping titles containing the tokens.

The third phase is score distribution computation (i.e., item score distribution 138) where distribution statistics of the item scores leveraging this model are computed. This information is used for normalizing token weights when they are used as a feature in the item ranker. In the online computation of title scores, the token weights learned during offline modeling are looked up (i.e., ISLE table lookup 142) and an aggregation function (i.e., title score aggregation 144) is applied on these weights to obtain a score for each item for the query. This is followed by a query level normalization step (i.e., title score normalization 146) using the score distribution statistics computed offline. This score for each item is used as a feature to train the item ranker and eventually used in the item ranking model during online processing. The following subsections elaborate these phases.

First, with reference to data sampling, to construct the training data for the ISLE model, the item tile demand engine 120 operates to sample search behavioral logs to gather query and clicked/skipped item titles. In operation, SRPs with at least one result clicked as valid SRPs and result items in the SRP until the deepest click can be considered as valid impressions, i.e., clicked and skipped items till the last clicked item. For each of these items, a range of behavioral signals (including clicks, sales and cart checkouts) are extracted. This gives a dataset of (query, item, engagement). For each item in this dataset, the title words and the name of item's category constitute its tokens and the engagement information on the item is used for all of its tokens which results in a dataset of (query, token, engagement). Within an SRP, a token/title may be counted only once for a given signal, e.g., for a query $q_i$ and token $t_j$, click count of token $t_j$ is 1 if $t_j$ is present in at least one of the clicked titles in the SRP, 0 otherwise. The same process may be adopted in counting all the other behavioral signals as well. This SRP level de-duplication is carried out to overcome the bias of over-represented tokens in the token data and identical titles in the title data. The effectiveness of this heuristic is more prominent in the token data, since the same toke appears in multiple titles frequently especially query tokens (tokens that appear in the query itself). For example, for the query iphone 6, the token iphone is likely to occur in majority of the item titles in a recall set, and without the de-duplication above, its click count will be much smaller compared to skip counts as only a few items in an SRP are clicked compared to skips. With the above mentioned process, for each query, the title and token engagement datasets are aggregated over the selected time frame. For performance reasons the item title demand engine may only retain a subset of tokens (selected typically by their impression count) for each query.

With reference to modeling title token skip probabilities, given a query, the ISLE model estimates skip probabilities of tokens appearing in titles using maximum likelihood. The skip probabilities are converted to click probabilities as (1−Pr(skip)) and stored as token scores. These token scores are aggregated to compute a title score for item titles in a recall set for the query. The maximum likelihood estimation process, used for generating the token skip probabilities, can be based on the dataset obtained data sampling described above. In operation, for a given query q, let there be N titles and M title tokens from the dataset mentioned above. $\lambda$ is a vector of length M where each position $\lambda_j$ corresponds to the skip probability of token j, i.e., probability of skipping a title if the token j appears in that title in an SRP for the query. The ISLE model starts with initial empirical estimations of $\lambda$ from user behavioral data (derived from the sampled dataset) of clicks, skips and impressions, and then optimizes this $\lambda$ vector of token skip probabilities as model parameters with maximum likelihood estimation. The model makes a simplifying assumption: the probability that a user will skip a title is the maximum of the token skip probabilities of the title tokens. Given a title consisting of some subset P of the M tokens with skip probabilities $\lambda_1, \ldots \lambda_P$, probability of skipping the title is:

$$\max_{j=1}^{P} \lambda_j$$

As previously noted with reference to modeling skips, from the sampled dataset with N titles and their engagement information, $(T_i, \delta_i)$ is the $i^{th}$ title, and $\delta_i=1$ if the $i^{th}$ title was clicked. $\lambda_j$ corresponds to token j of $T_i$. So the likelihood of the data is:

$$L = \prod_{i=1}^{N} (\max_j \lambda_j)^{1-\delta_i} (1 - \max_j \lambda_j)^{\delta_i}$$

In this dataset accumulated over weeks of behavioral data, the same titles can be impressed multiple times for a given query. Accordingly, the likelihood function is given by:

$$L = \prod_{i=1}^{N} (\max_j \lambda_j)^{numSkips^i} (1 - \max_j \lambda_j)^{numClicks^i}$$

numSkips$^i$ and numClicks$^i$ in the equation above is the number of times the $i^{th}$ title was skipped/clicked. The ISLE model optimizes the parameters $\lambda$ of the above model by maximizing the log likelihood of L with gradient descent. Note the gradient of the log likelihood function w.r.t the optimization parameters is:

$$\frac{d(\log L)}{d\lambda_j} = \begin{cases} \sum_{i=1}^{N} \frac{numSkips^i}{\lambda_j} - \frac{numClicks^i}{1-\lambda_j}, & \text{if } \lambda_j \text{ is } \max_j \lambda_j \\ 0, & \end{cases}$$

Upon convergence, the model learns a skip probability for each of the tokens in vector $\lambda$. As mentioned earlier, the item title demand engine can be operated to convert these token skip probabilities to click probabilities (1−$\lambda$) and use these learned token weights subsequently for scoring titles.

With reference to augmenting ISLE with additional signals, (e.g., sale signals), the ISLE model described so far uses clicks and skips from user behavioral data to learn token weights. In a content platform or item listing platform, sale and sale-related behavioral signals are readily available and can be used to augment the click-only model. These signals while sparser than clicks are cleaner and better correlate with demand. While the item title demand engine 120 can use several user actions that indicate purchase intent at the platform, for illustration purposes, the add-to-cart and buy actions along with clicks, are described below to model the token skip probabilities. The augmented click-sale model (ISLE-CS), modifies the likelihood function as follows:

$$L' = \prod_{i=1}^{N} (\max_j \lambda_j)^{numSkips^i} (1 - \max_j \lambda_j)^{numAugClicks^i}$$

where numAugClicks$^i$ is the weighted counts of clicks and the sale signals in the augmented model (here, numAugClicks$^i$=numBuy$^i$*w$^{buy}$+ numAddToCart$^i$*w$^{AddToCart}$+numClicks$^i$*w$^{click}$). These weights for each signal are added as additional parameters along with λ for the model to optimize. Note that since the ISLE model is query-specific these learned signal weights are also query-specific.

The gradient of log likelihood w.r.t λ now becomes:

$$\frac{d(\log L')}{d\lambda_j} = \begin{cases} \sum_{i=1}^{N} \frac{numSkips^i}{\lambda_j} - \frac{numAugClicks^i}{1-\lambda_j}, & \text{if } \lambda_j \text{ is } \max_j \lambda_j \\ 0, & \end{cases}$$

And the gradient of log likelihood w.r.t to the sale weights is computed as the following (for buy):

$$\frac{d(\log L')}{dw_{buy}} = \sum_{i=1}^{N} numBuy^j * \log(1 - \max_j \lambda_j)$$

Similar to the click-only ISLE model, the augmented sale-weight model described here maximizes the updated log likelihood function and upon convergence learns token skip probabilities, where the weights for each of the sale signals are also optimized.

Turning to aggregating token weights to score item titles, once the query-specific token weight dictionary is computed from the ISLE modeling stages described above, an aggregation stage is carried out to score each item title in the recall set. Note that because the item title demand engine 120 may store only a limited number of tokens per query in the lookup table, the item title demand engine 120 may not necessarily have a match for all tokens in a given title. Moreover, several different aggregation functions can be implemented for this stage, described below:

$$TitleScore^i_{averageAll} = \frac{\sum_{j=1}^{M} tokenWeight^j}{\text{number of tokens in title } T_i}$$

$$TitleScore^i_{averageMatched} = \frac{\sum_{j=1}^{M} tokenWeight^j}{\text{number of tokens in } T_i \text{ with match in model dictionary}}$$

TitleScore$_{max}^i$=max(token weights in title $T_i$)

TitleScore$_{min}^i$=min(token weights in title $T_i$)

TitleScore$_{sum}^i$=sum$_{j=1}^{M}$ token Weight$^j$ in $T_i$

With reference to title normalization, while the title scores generated in the previous step are sufficient for predicting the relative rank order of items for a query in terms of demand, the actual scores may be inconsistent between queries, i.e., the typical skip/click probabilities for relevant and irrelevant items for different queries may vary. This can make it difficult for the item ranking models (e.g., ranking engine 150) to consume ISLE title score as a feature. To handle this, item title demand engine 120 operates to compute the typical distribution of ISLE title scores for each query over a period of time ($D_{stat}$ in the following), and use this distribution to normalize the scores from the previous step. Several normalization techniques (equations below, TS stands for Title Scaling), and advantageously the Median-InterQuartile scaling can be implemented.

$$TS^i_{Zscore} = \frac{T_i - D_{mean}}{D_{stdDev}}$$

$$TS^i_{MaxMin} = \frac{T_i - D_{min}}{D_{max} - D_{min}}$$

$$TS^i_{interquartile} = \frac{T_i - D_{quartile1}}{D_{quartile3} - D_{quartile1}}$$

$$TS^i_{MedianRatio} = \frac{T_i}{D_{median}}$$

$$TS^i_{MedianInterQuartile} = \frac{T_i - D_{median}}{D_{quartile3} - D_{quartile1}}$$

Turning to the ranking engine 150, as described earlier, the item title demand model can be used in overall ranking for item search. Accordingly, the item title demand model can be implemented as a standalone ranker and as a feature in an overall ranking model. The ISLE model is an improvement over conventional systems (e.g., Naïve Bayes title model) used for overall ranking. With reference to the standalone feature evaluation, the ISLE model operates as a complete item ranker which ranks items in decreasing order of this ISLE score. Compared to a baseline model (i.e., Naïve Bayes based model) the item title demand model performs better than the baseline feature. Turning to the overall item ranking model evaluation, the ISLE operates as a feature for our overall item ranker. An item ranking model with ISLE model as a feature is compared to the same item ranking model with a baseline feature instead of the ISLE model. Again, the ISLE model, this time as feature in an item ranking model, showed improvement over the item ranking model having the baseline model as a feature.

Figure 5:
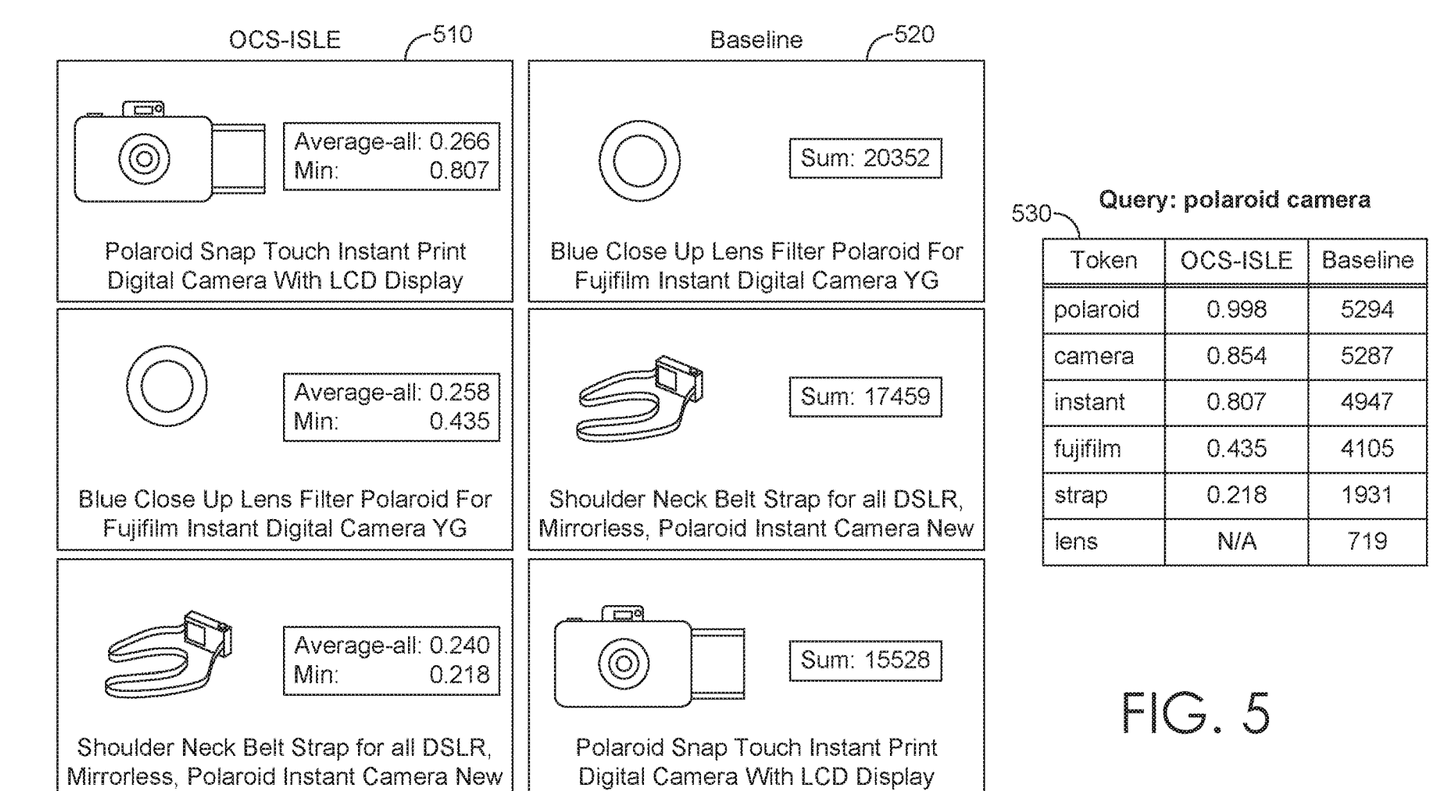
FIG. 5 is an exemplary illustration of implementing the search system with an item title demand engine, with embodiments described herein.

With reference to FIGS. 4 and 5, illustrations associated with a couple of anecdotal queries, to illustrate the improvement of the ISLE model over a conventional system (e.g., Naïve Bayes based model) are provided. The examples show the relative ranking of three item titles for each query when they are ranked solely based on OCS-ISLE scores and the baseline model score. The OCS-ISLE model is based on a weighted combination of clicks and sales where the weights are also learned in the model.

For a first query polaroid camera, FIG. 5 shows three items ranked based on their OCS-ISLE title score (i.e., OCS-ISLE 510)—note that in this case the items appear in the same order for both average-all and min score, the same items ordered using baseline title demand score (i.e., baseline 520) and the relevant token scores for this query from both OCS-ISLE and baseline models. The top item in OCS-ISLE ranking is the only relevant item (a polaroid camera) while the other two are camera accessories. Between the two accessories, one can argue that the lens filter designed specifically for polaroid cameras is more relevant than the strap. This improved ranking follows directly from the corresponding model tokens, their weights and aggregation functions as shown in table 530. The OCS-ISLE model has fewer irrelevant tokens (no lens token), more balanced weights (neutral weight for brand token fujifilm) and better aggregation methods (average-all penalizes titles with many unknown tokens and min follows from the basic model assumption).

Figure 6:
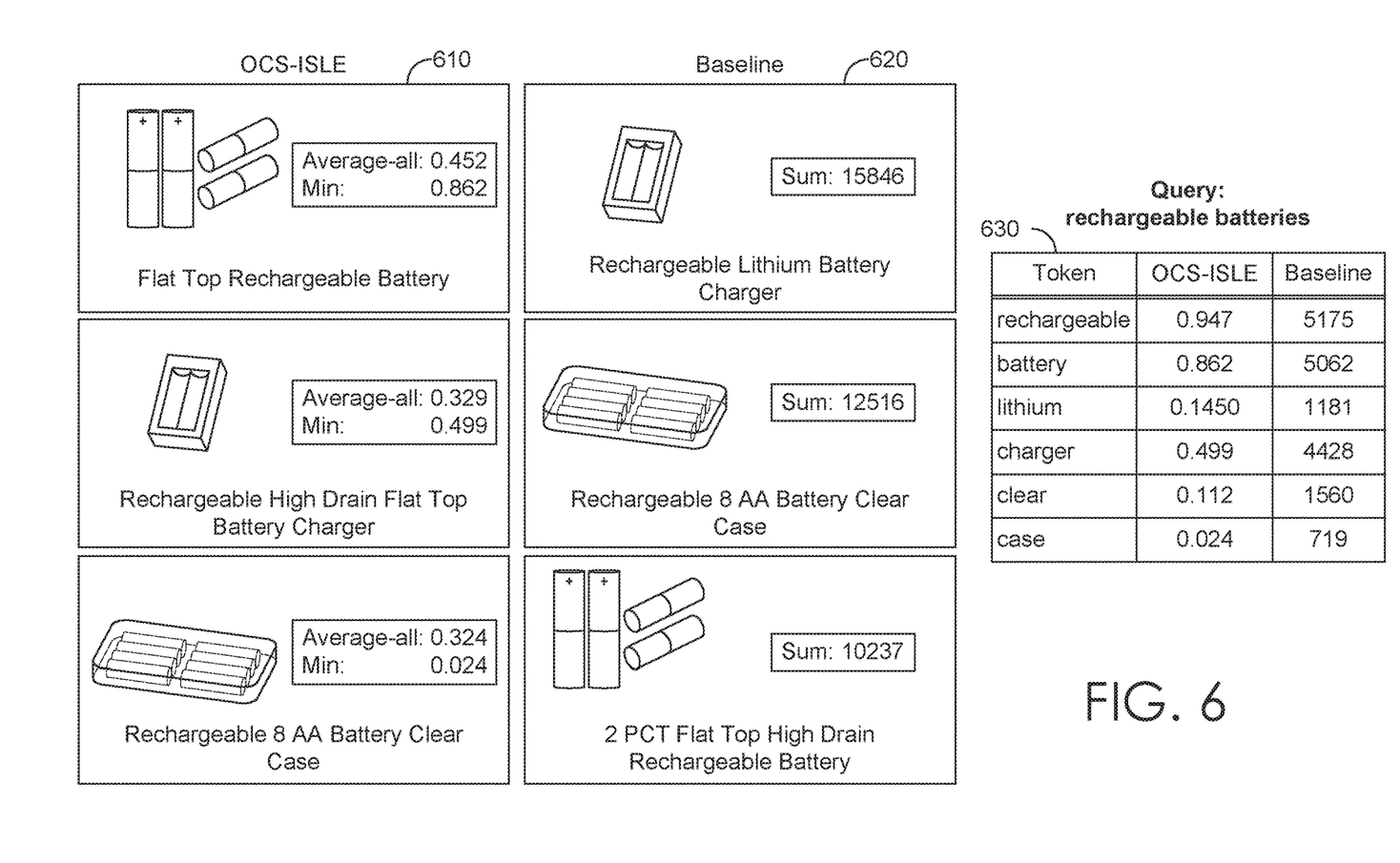
FIG. 6 is an exemplary illustration of implementing the search system with an item title demand engine, with embodiments described herein.

A similar depiction for query rechargeable batteries is shown in FIG. 6 that shows three items ranked based on their OCS-ISLE title score (i.e., OCS-ISLE 610) and the same items ordered using baseline title demand score (i.e., baseline 620). Here the only relevant item is the rechargeable battery which is ranked at top by OCS-ISLE, and the other two irrelevant items are a charger and a case for the battery. Among the two irrelevant items, charger receives higher weights than case, clear by OCS-ISLE learned from user behavioral signals. The average-all and min function along with the relative token weights result in superior ranking of items by OCS-ISLE compared to baseline as shown in table 630.

Figure 7:
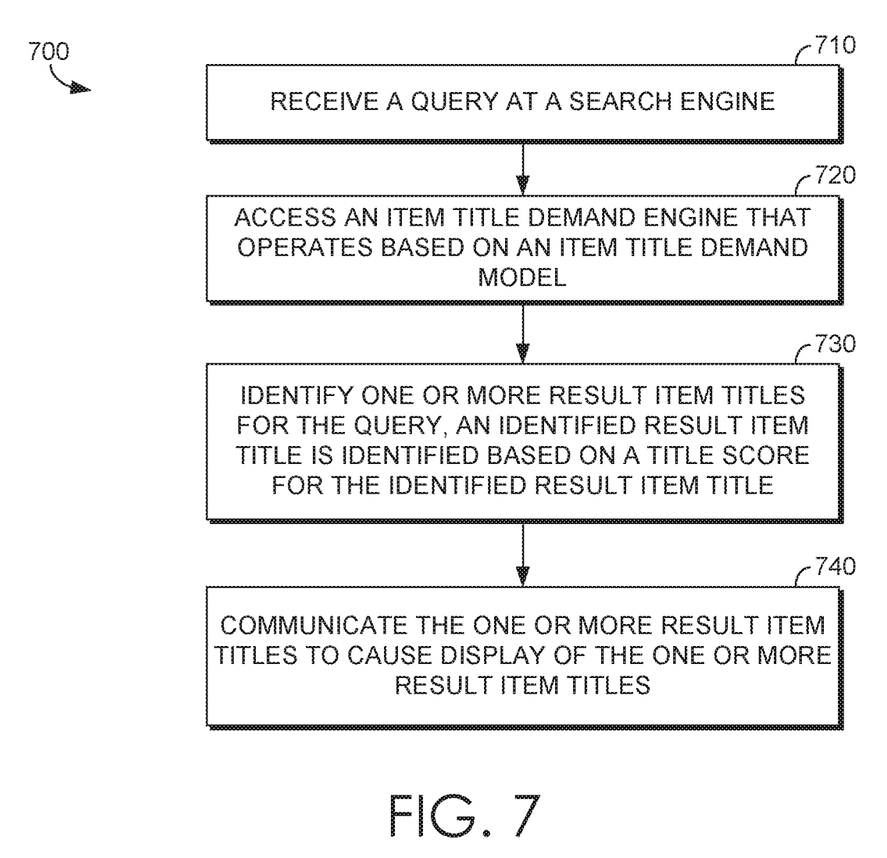
FIG. 7 is a flow diagram showing an exemplary method for implementing a search system with an item title demand engine, in accordance with embodiments described herein.
Figure 8:
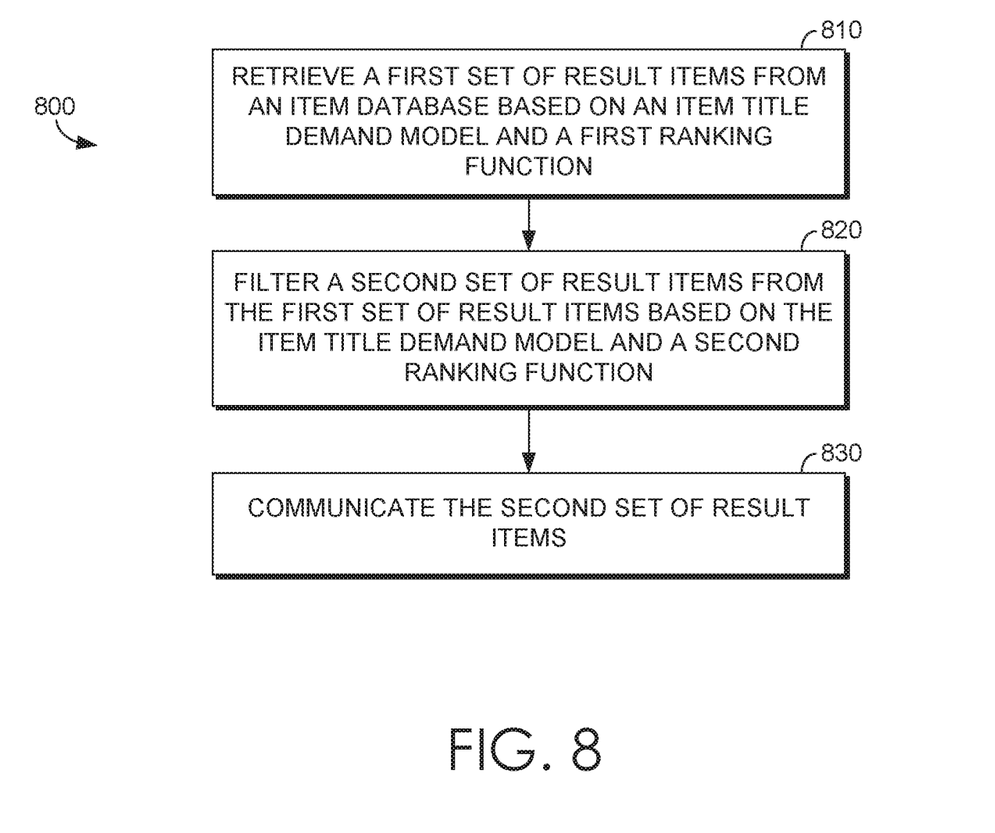
FIG. 8 is a flow diagram showing an exemplary method for implementing a search system with an item title demand engine, in accordance with embodiments described herein.

With reference to FIGS. 7 and 8, flow diagrams are provided illustrating methods for implementing a search system for providing query result items based on an item title demand model. The methods can be performed using the search system described herein. In embodiments, one or more computer storage media having computer-executable instructions embodied thereon that, when executed, by one or more processors, can cause the one or more processors to perform the methods in the search system.

Turning to FIG. 7, a flow diagram is provided that illustrates a method 700 for implementing a search system for providing query result items based on an item title demand model. Initially at block 710, a query is received at a search engine. At block 720, an item title demand engine that operates based on an item title demand model, is accessed. The item title demand model uses token weights, based on skip probabilities of tokens in item titles, to determine title scores for result item titles for corresponding queries. At block 730, based on accessing the item title demand engine, one or more result item titles for the query is identified from a plurality of items in an item database. An identified result item title of the one or more result item titles is identified based on a title score for the identified result item title. The title score is determined using the item title demand model and a highest skip probability of a token in the result item title. The one or more result item titles are communicated to cause display of the one or more result item titles.

Turning to FIG. 8, a flow diagram is provided that illustrates a method 800 for implementing a search system for providing query result items based on an item title demand model. Initially at block 810, a first set of result items is retrieved from an item database. The first set of result items are retrieved and ranked based on an item title demand model and a first ranking function. The item title demand model uses token weights, based on skip probabilities of tokens in item titles, to determine title scores for result item titles for corresponding queries. At block 820, a second set of result items are filtered from the first set of result times based on the item title demand model and a second ranking function. At block 830, the second set of result items are communicated.

With reference to the search system 100, embodiments described herein support providing query result items based on an item title demand model. The search system components refer to integrated components that implement the image search system. The integrated components refer to the hardware architecture and software framework that support functionality using the search system components. The hardware architecture refers to physical components and interrelationships thereof and the software framework refers to software providing functionality that can be implemented with hardware operated on a device. The end-to-end software-based search system can operate within the other components to operate computer hardware to provide search system functionality. As such, the search system components can manage resources and provide services for the search system functionality. Any other variations and combinations thereof are contemplated with embodiments of the present invention.

By way of example, the search system can include an API library that includes specifications for routines, data structures, object classes, and variables may support the interaction the hardware architecture of the device and the software framework of the search system. These APIs include configuration specifications for the search system such that the components therein can communicate with each other for form generation, as described herein.

With reference to FIG. 1, FIG. 1 illustrates an exemplary search system 100 in which implementations of the present disclosure may be employed. In particular, FIG. 1 shows a high level architecture of search system 100 having components in accordance with implementations of the present disclosure. It should be understood that this and other arrangements described herein are set forth only as examples. In addition, a system, as used herein, refers to any device, process, or service or combination thereof. As used herein, engine is synonymous with system unless otherwise stated. A system may be implemented using components or generators as hardware, software, firmware, a special-purpose device, or any combination thereof. A system may be integrated into a single device or it may be distributed over multiple devices. The various components or generators of a system may be co-located or distributed. For example, although discussed for clarity as the content application component, operations discussed can be performed in a distributed manner. The system may be formed from other systems and components thereof. It should be understood that this and other arrangements described herein are set forth only as examples.

Having identified various component of the search system 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are exemplary in nature and in number and are not to be construed as limiting for all implementations of the present disclosure. The search system 100 functionality can be further described based on the functionality and features of the above-listed components.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 9:
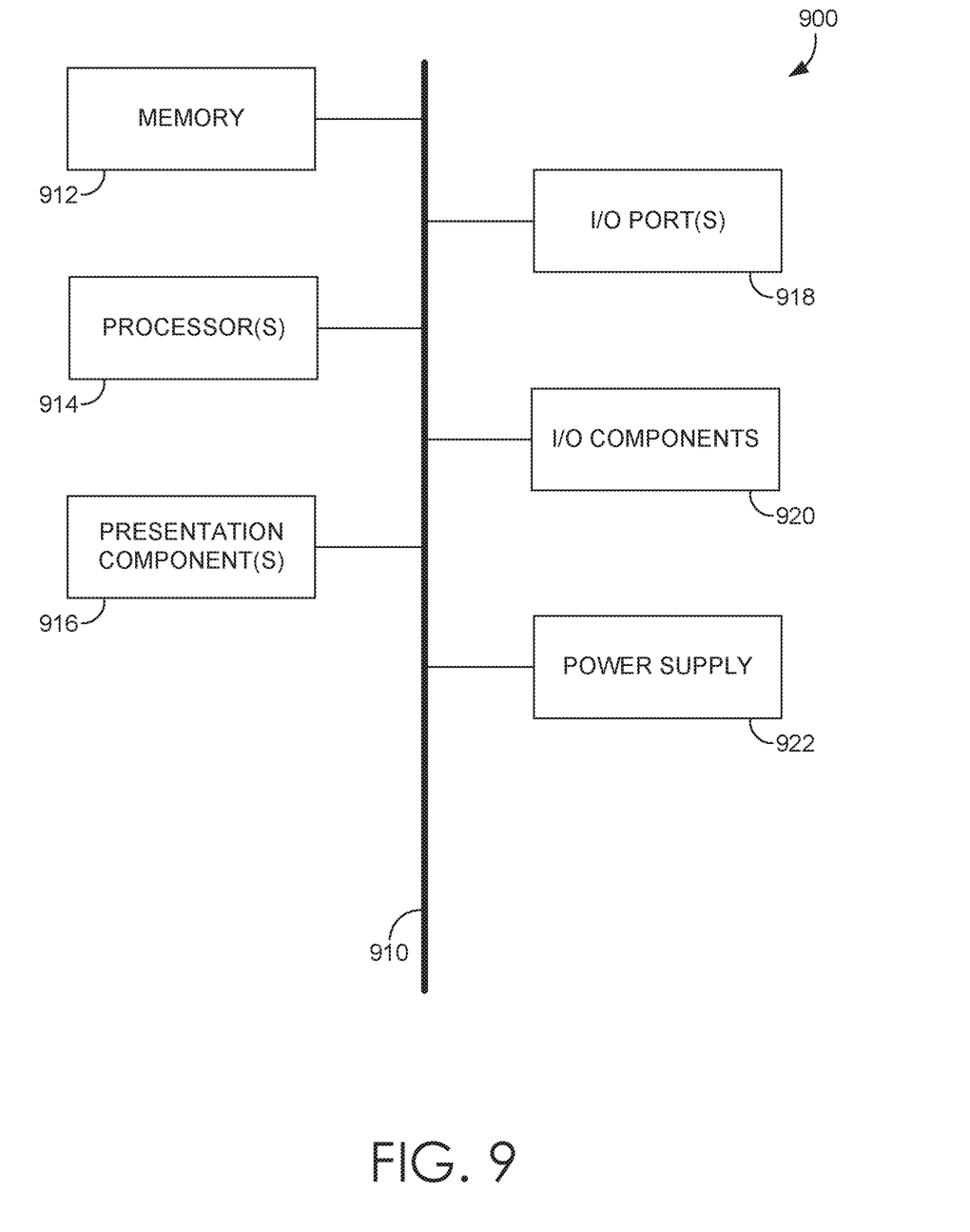
FIG. 9 is a block diagram of an exemplary computing environment suitable for use in implementing embodiments described herein.

Having described an overview of embodiments of the present invention, an exemplary operating environment in which embodiments of the present invention may be implemented is described below in order to provide a general context for various aspects of the present invention. Referring initially to FIG. 9 in particular, an exemplary operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output ports 918, input/output components 920, and an illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 9 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action can be performed to completion or interrupted based on an occurrence of another action. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the distributed data object management system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A computer-implemented for providing query result items, the method comprising:
    receiving a query at a search engine;
    accessing an item title demand engine that operates based on an item title demand model, the item title demand model uses token weights, based on skip probabilities of tokens in item titles, to determine title scores for result item titles for corresponding queries;
    based on accessing the item title demand engine, identifying, from a plurality of items in an item database, one or more result item titles for the query,
    wherein an identified result item title of the one or more result item titles is identified based on a title score for the identified result item title, wherein the title score is determined using the item title demand model and a skip probability of a token in the result item title,
    wherein the skip probability of the token in the result item title is a predicted likelihood that the result item title will be skipped because the token is part of the result item title,
    wherein the identified result item is associated with the title score based on one of a first token having a first skip probability or a second token having a second skip probability defining a set of skip probabilities of the first token and the second token of the identified result item; and
    communicating the one or more result item titles to cause display of the one or more result item titles.

2. The method of claim 1, wherein the title score corresponds to a highest skip probability that is a skip probability of a worst token of the identified result item, wherein the worst token corresponds to the first token having the first skip probability or the second token having the second skip probability.

3. The method of claim 1, wherein the item title demand model is an item skip likelihood estimation model that is executed based on a first phase of offline computation of tokens weights and a second phase of online computation of title scores, wherein offline computation comprises, based on a historical user search behavior data, for a selected query, generating token weights using maximum likelihood.

4. The method of claim 3, wherein the historical user search behavior data includes a data-set of the plurality of queries and clicked and skipped item titles on search results pages for the plurality of queries, wherein a click signal for an item is augmented with an additional click signal having a higher correlation with demand for the item associated with a clicked item title.

5. The method of claim 2, wherein online computation comprises, for a received query, accessing relevant tokens weights for that query and using an aggregation function to compute title scores for result item titles; or
    wherein online computation comprises generating normalized title scores, wherein normalized title scores are used as a feature in a ranking engine of the search engine.

6. The method of claim 1, wherein the one or more result item titles are caused to be displayed in a ranked order based at least in part on their corresponding title scores.

7. The method of claim 1, wherein a ranking engine of the search engine uses the item title demand model for both a first round ranking function and a second round ranking function, wherein the first round ranking function is for a recall set of result items of a query; and the second round ranking function is for a filtered subset of the recall set of result items.

8. One or more computer storage media having computer-executable instructions embodied thereon that, when executed, by one or more processors, cause the one or more processors to perform a method for providing query result items, the method comprising:
    receiving a query at a search engine;
    accessing an item title demand engine that operates based on an item title demand model, the item title demand model uses token weights, based on skip probabilities of tokens in item titles, to determine title scores for result item titles for corresponding queries;
    based on accessing the item title demand engine, identifying, from a plurality of items in an item database, one or more result item titles for the query,
    wherein an identified result item title of the one or more result item titles is identified based on a title score for the identified result item title, wherein the title score is determined using the item title demand model and a skip probability of a token in the result item title
    wherein the skip probability of the token in the result item title is a predicted likelihood that the result item title will be skipped because the token is part of the result item title,
    wherein the identified result item is associated with the title score based on one of a first token having a first skip probability or a second token having a second skip probability defining a set of skip probabilities of the first token and the second token of the identified result item; and
    communicating the one or more result item titles to cause display of the one or more result item titles.

9. The media of claim 8, wherein the title score corresponds to a highest skip probability that is a skip probability of a worst token of the identified result item, wherein the worst token corresponds to the first token having the first skip probability or the second token having the second skip probability.

10. The media of claim 8, wherein the item title demand model is an item skip likelihood estimation model that is executed based on a first phase of offline computation of tokens weights and a second phase of online computation of title scores, wherein offline computation comprises, based on a historical user search behavior data, for a selected query, generating token weights using maximum likelihood.

11. The media of claim 10, wherein the historical user search behavior data includes a data-set of the plurality of queries and clicked and skipped item titles on search results pages for the plurality of queries, wherein a click signal for an item is augmented with an additional click signal having a higher correlation with demand for the item associated with a clicked item title.

12. The media of claim 9, wherein online computation comprises, for a received query, accessing relevant tokens weights for that query and using an aggregation function to compute title scores for result item titles; or
 wherein online computation comprises generating normalized title scores, wherein normalized title scores are used as a feature in a ranking engine of the search engine.

13. The media of claim 8, wherein the one or more result item titles are caused to be displayed in a ranked order based at least in part on their corresponding title scores.

14. The media of claim 8, wherein a ranking engine of the search engine uses the item title demand model for both a first round ranking function and a second round ranking function, wherein the first round ranking function is for a recall set of result items of a query; and the second round ranking function is for a filtered subset of the recall set of result items.

15. A search system for providing query result items, the system comprising:
 one or more processors; and
 one or more computer storage media storing computer-useable instructions that, when used by the one or more processors, cause the one or more processors to:
 receive a query at a search engine;
 access an item title demand engine that operates based on an item title demand model, the item title demand model uses token weights, based on skip probabilities of tokens in item titles, to determine title scores for result item titles for corresponding queries;
 based on accessing the item title demand engine, identifying, from a plurality of items in an item database, one or more result item titles for the query,
 wherein an identified result item title of the one or more result item titles is identified based on a title score for the identified result item title, wherein the title score is determined using the item title demand model and a skip probability of a token in the result item title,
 wherein the skip probability of the token in the result item title is a predicted likelihood that the result item title will be skipped because the token is part of the result item title,
 wherein the identified result item is associated with the title score based on one of a first token having a first skip probability or a second token having a second skip probability defining a set of skip probabilities of the first token and the second token of the identified result item; and
 communicating the one or more result item titles.

16. The system of claim 15, wherein the title score corresponds to a highest skip probability that is a skip probability of a worst token of the identified result item, wherein the worst token corresponds to the first token having the first skip probability or the second token having the second skip probability.

17. The system of claim 15, further comprising a token weight computation component configured to execute a first phase of offline computation,
 wherein offline computation comprises, based on a historical user search behavior data, for a selected query, generating token weights using maximum likelihood, wherein the historical user search behavior data includes a data-set of the plurality of queries and clicked and skipped item titles on search results pages for the plurality of queries,
 wherein a click signal for an item is augmented with an additional click signal having a higher correlation with demand for the item associated with a clicked item title, wherein the additional click signal is selected from one of the following: a sale of an item associated a clicked item title, and an addition to a shopping cart of the item associated with the clicked item title.

18. The system of claim 15, further comprising a title score component configured to execute a second phase of online computation of title score, online computation comprises, for a received query, accessing using a table lookup, relevant tokens weights and score distributions for the received query.

19. The system of claim 15, wherein the item title demand model is an item skip likelihood estimation model that is executed based on a first phase of offline computation of tokens weights and a second phase of online computation of title scores,
 wherein the one or more result item titles are caused to be displayed in a ranked order based at least in part on their corresponding title scores.

20. The system of claim 15, further comprising a ranking engine configured to utilize the item title demand model for both a first round ranking function and a second round ranking function, wherein the first round ranking function is for a recall set of result items of a query; and the second round ranking function is for a filtered subset of the recall set of result items.

* * * * *